United States Patent [19]

Siligoni et al.

[11] Patent Number: 4,638,122
[45] Date of Patent: Jan. 20, 1987

[54] MONOLITHICALLY INTEGRATABLE TELEPHONE CIRCUIT FOR GENERATING CONTROL SIGNALS FOR DISPLAYING TELEPHONE CHARGES

[75] Inventors: Marco Siligoni, Milan; Ferdinando Lari, Mantova; Vanni Saviotti, Milan; Vittorio Comino, Turin, all of Italy

[73] Assignee: SGS-ATES Componenti Elettronici SpA, Milan, Italy

[21] Appl. No.: 731,167

[22] Filed: May 6, 1985

[30] Foreign Application Priority Data

May 4, 1984 [IT] Italy .................. 20783 A/84
Jun. 6, 1984 [IT] Italy .................. 21270 A/84

[51] Int. Cl.$^4$ .................................. H04M 15/18
[52] U.S. Cl. .................................. 379/124
[58] Field of Search ............ 179/7 R, 7 MM, 7.1 R, 179/7.1 TP

[56] References Cited

U.S. PATENT DOCUMENTS 4,264,956  4/1981  Delaney .................. 179/7.1 R
4,410,765  10/1983  Hestad et al. .......... 179/7.1 R Primary Examiner—Gene Z. Rubinson
Assistant Examiner—David R. Schuster
Attorney, Agent, or Firm—Wenderoth, Lind & Ponack

[57] ABSTRACT

A telephone circuit which may be monolithically integrated, for generating control signals for displaying the telephone charges to a telephone user, is coupled to a AC voltage signal generator having a predetermined amplitude and frequency which are constant over time. The circuit includes a voltage generator for generating voltage signals which are spaced over time and have a trapezoidal pulse waveshape. A multiplier circuit calculates the product of the signals supplied by the two generators and supplies a signal which is sent to the speech circuit of the subscriber's line and is added to the speech (i.e.—conversation) signals. The circuit also includes a circuit for receiving an image signal of the overall signal adapted to the telephone line; a high-pass filter for eliminating the speech signal components from the image signal; a rectifier circuit for rectifying the filtered signal and a comparator for comparing the rectified signal with a reference signal. If the amplitude of the rectified signal is greater than the amplitude of the reference signal, the comparator generates a signal designed to stop the increase in the level of the trapezoidal pulse signals generated by the voltage generator thereby regulating the amplitude of the trapezoidal pulse signals.

2 Claims, 2 Drawing Figures

4,638,122

MONOLITHICALLY INTEGRATABLE TELEPHONE CIRCUIT FOR GENERATING CONTROL SIGNALS FOR DISPLAYING TELEPHONE CHARGES

BACKGROUND OF THE INVENTION

The present invention relates to telephone circuits for generating signals designed to display the relative charges of a telephone call in progress to the subscriber and in particular to telephone circuits, which may be monolithically integrated, for generating control signals for displaying the charges to the subscriber and which is designed to form, together with the speech circuit of the subscriber's line, an interface between the subscriber's telephone line and exchange components.

A subscriber's telephone line is supplied by a D.C. voltage generator, in series with which there are connected other voltage signal generators which generate speech band conversation signals, ringing signals and the signals designed to display the charge to the subscriber.

Both the speech circuit and the ringing circuit of the subscriber's telephone set are connected to the terminals of the line, as well as to other possible devices, which may be connected internally or externally to the set itself. For example, a display may be connected to the telephone set for displaying the accrued total of the charges of the telephone call in progress which is carried out by the appropriate exchange components.

The subscriber's charge display is, as mentioned above, driven by the telephone exchange, via the same telephone line, by means of control signals, normally called "charging signals".

These control signals must have a high amplitude with respect to the maximum amplitude of the speech signals, but cannot be embodied as signals having a pulse waveshape since the leading and trailing edges of such pulses would lead to harmonics which are likely to disturb not only the user of the line, but also the users of neighboring lines. In order to avoid disturbances on other neighboring lines, it is also necessary for the level of these "charging signals" in the line to have a low sensitivity to impedance variations in the line.

In practice, use is made of AC signals having a duration which is limited over time (approximately 100 msec) and a frequency (12 or 16 KHz) which is considerably higher than the frequency of the telephone speech signals (0.3–3.4 KHz), with relatively long leading and trailing times.

At present the "charging signals" are generally formed and supplied directly to the line by means of exchange devices of the electromechanical type comprising a resonant circuit coupled inductively, via a transformer, to the subscriber's telephone line and actuated at predetermined time intervals.

The leading and trailing edges of such charging signals normally have an exponential waveshape.

The solution described above is therefore comparatively costly and makes it necessary to tune the resonant circuit accurately to the required frequency.

SUMMARY OF THE INVENTION

The object of the present invention is to provide a telephone circuit for generating control signals for displaying the charge to the subscriber which may be monolithically integrated and is designed to form, together with the speech circuit of the subscriber's line, an interface between the subscriber's telephone line and exchange control components. The circuit forms these signals in the way which is most suited to the requirements of modern telephone systems of the electronic type and has a greater versatility of use with respect to the prior art.

This object may be achieved by providing a telephone circuit for generating control signals for a subscriber's charging display and constituting an interface between a subscriber's telephone line an exchange control components together with a subscriber's line speech circuit, said subscriber's line speech circuit comprising a speech signal generator and a circuit means for adapting signals supplied by said speech signal generator to the subscriber's telephone line, said telephone circuit comprising: a first voltage signal generator for supplying an AC signal having a predetermined amplitude and frequency which are constant over time, and a second voltage signal generator for supplying pulse signals which are uniformly spaced over time and which have a trapezoidal pulse waveshape, said second voltage generator being coupled to said exchange control components which determine starting times of a leading edge and a trailing edge of each of said pulse signals;

a multiplier circuit which is connected to said first and second voltage generators and which has a gain which is varied in a linear manner in accordance with a voltage level of said pulse signals generated by said second voltage generator, said multiplier calculating the product over time of said voltage signals supplied by said first and second voltage generators and supplying a voltage signal which is added to signals generated by said conversation signal generator included in said subscriber's line speech circuit and a coupling means for receiving, at a point along a signal path of said subscriber's line speech circuit, an image signal of said signals adapted to said subscriber's telephone line;

a high-pass filter connected to said coupling means for filtering said image signal so as to eliminate components of said signal included in a telephone band of speech signals; a rectifier circuit connected to said high-pass filter for rectifying said filtered image signal; and a comparator connected to said rectifier circuit and to a reference signal generator for comparing a rectified signal output by said rectifier circuit with a reference signal generated by said reference signal generator and for generating, if an amplitude of said rectified signal is greater than an amplitude of said reference signal, a signal for stopping an increase of the signal level of a leading edge of signals generated by said second voltage generator, said signal level being kept constant up to the beginning of a trailing edge of said signals for said second voltage signal generator by means of a memory means included in the said second signal voltage generator.

Furthermore, the above-noted voltage signal generator may comprise a capacitor having a first terminal which is maintained at a constant reference potential and having a second terminal which is coupled to a supply source having a positive potential and having a terminal which is coupled to a supply source having a positive potential with respect to said reference potential via a first controlled switch and a first constant current generator and is also coupled to a non-positive potential reference with respect to said reference potential via a second controlled switch and a second constant current generator, and wherein the non-simultaneous closure of said first and second controlled switches is carried out by exchange control means, an opening of said first switch being caused by said signal generated by said comparator, and a voltage between said first and second terminals of said capacitor forms said signal supplied by said second voltage signal generator, and wherein said capacitor also comprises said memory means for keeping said signal level constant when said first and second switches are open.

BRIEF DESCRIPTION OF THE DRAWINGS

The invention is illustrated in detail in the following description, given purely by way of non-limiting example, with reference to the attached drawings, in which.

DESCRIPTION OF THE PREFERRED EMBODIMENT

Figures 1, 2:
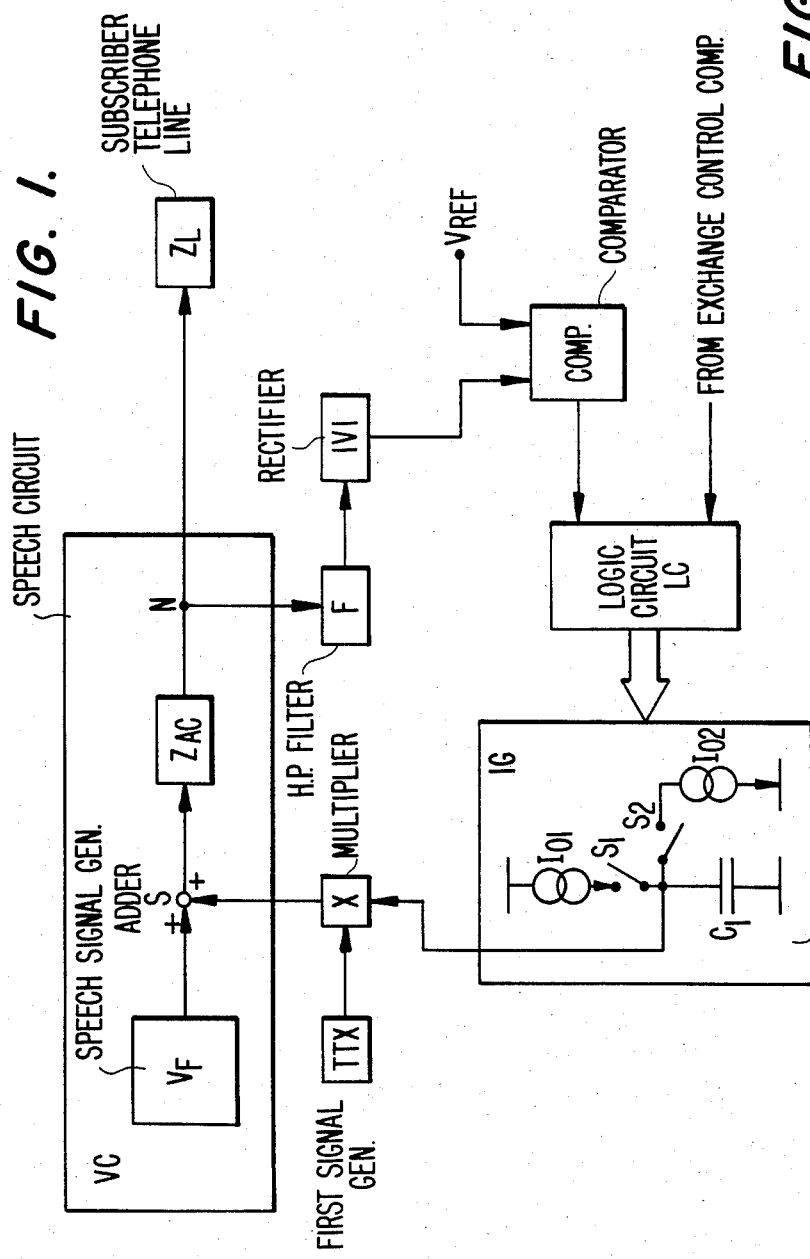
FIG. 1 shows a block diagram of a telephone circuit which may be monolithically integrated and comprises a circuit for generating "charging signals" in accordance with the present invention.
FIG. 2 illustrates a concrete example of the logic circuit LC of FIG. 1.

A telephone circuit in accordance with the present invention is coupled to a first voltage signal generator, shown in the FIG. 1 by a block TTX, which is located amongst the exchange components and supplies an AC signal having a predetermined amplitude and frequency which are constant over time.

The frequency of this AC signal is selected to have a value which is equal to the value desired for the "charging signals", i.e. 12 or 16 KHz. The circuit may be comprised of a second voltage signal generator, shown in FIG. 1 by a block IG, which supplies pulsed DC signals which are uniformly spaced over time and have a trapezoidal pulse waveshape.

This second voltage generator IG is formed by a circuit comprising, as shown schematically within the block itself, a capacitor $C_1$ having one terminal which is connected to ground or to an equivalent potential reference and having a second terminal which is coupled to a supply source which has a positive potential with respect to the ground potential, the second terminal of the capacitor $C_1$ being coupled to the supply source via a first controlled switch $S_1$ and a first constant current generator $I_{01}$.

The second terminal of the capacitor $C_1$ is also coupled to ground or to a negative potential with respect to the ground potential via a second switch $S_2$ and a second constant current generator $I_{02}$. In order to obtain signals with symmetrical leading and trailing edges, two identical constant current generators are generally used. The second voltage signal generator IG is coupled to the exchange control components (not shown), by means of a logic circuit, shown by a block LC, which controls, when suitable synchronization signals are supplied by the exchange, the closure of the switches $S_1$ and $S_2$. The closure of the switches $S_1$ and $S_2$ never occur simultaneously.

As noted in FIG. 2, a control signal from the exchange control components are fed to an inverter INV and one input of a 2-input AND gate.

The output of the inverter INV is used to directly control the switch $S_2$ as well as being connected to the reset input R of the SR flip-flop FF.

A signal from the comparator COMP is connected to the set input S of the flip-flop FF and the Q output of the flip-flop FF is connected to the second input of the AND gate whose output controls the operation of the switch $S_1$ When, with the capacitor $C_1$ initially discharged, the switch $S_1$ is closed, the constant current generator $I_{01}$ charges this capacitor and generates at its terminals a voltage $V_C = (I_0/C)t$ which increases in a linear manner over time, wherein C is the capacitance of the capacitor and $I_0$ is the constant value of the charging current.

When the logic circuit LC controls the opening of the switch $S_1$ which, as will be shown below, is not caused by the control components of the exchange, the voltage at the terminals of the capacitor $C_1$ remains virtually constant until the switch $S_2$ is closed. The constant current generator $I_{02}$ then discharges the capacitor by generating at its terminals a voltage which decreases in a linear manner with a voltage curve which is the reverse of the charging voltage curve.

The voltage at the terminals of the capacitor $C_1$ constitutes the voltage signal which is supplied by the second signal generator IG. The capacitor $C_1$ also acts as a memory component which, when the switch $S_2$ is opened, stores the voltage level at its terminals and transfers it as a constant voltage output signal up to the time at which closure of the switch $S_2$ takes place.

The discharging of the capacitor is signalled by a suitable circuit means (not shown) which, when the voltage at the terminals of the capacitor is zero, also opens the switch $S_2$ and keeps it open until a signal from the exchange control components causes its subsequent closure via the logic circuit LC.

The voltage over time at the terminals of the capacitor $C_1$, and therefore the signal which it forms, consequently has a trapezoidal pulse waveshape.

A telephone circuit in accordance with the present invention further comprises a multiplier circuit, shown by block X, which calculates the product over time of the voltage signals supplied by the first and second voltage generators TTX and IG. It thus supplies a voltage signal which is added, in an adder node S, to the signals generated by a conversation signal generator VF, in the subscriber's receiver, included in the speech circuit of the subscriber's line with which the "charging signal" generation circuit forms the interface between the exchange components and the subscriber's telephone line. Such a multiplier circuit may be, for example, a Gilbert Multiplier Cell as discussed in Analysis and Design of Analog Integrated Circuits by P. Gray and R. Meyer, Wiley & Sons, published in 1977.

The multiplier circuit X is of the type having a gain which varies in a linear manner with the level of one of the two signals of which it calculates the product, and in this case with the level of the signal supplied by the second voltage generator IG.

The overall signal over time supplied by the multiplier circuit X is therefore a sequence of AC signals having a limited duration an a constant frequency spaced uniformly over time, whose envelope, both in the positive and in the negative portion, is of a trapezoidal shape.

This envelope is the most suitable for the control signals of current charging displays.

The speech circuit of the subscriber's line, shown in the block VC, to which the "charging signal" generator circuit is coupled and together with which it may be monolithically integrated, also comprises circuit means for adapting to the subscriber's telephone line, shown by the block $Z_L$, the speech signal being received which are supplied from the speech signal generator $V_F$.

These circuit means, shown by the block $Z_{AC}$ located within the block VC, are equivalent to an impedance, but may in fact be constructed, as known to persons skilled in the art, by complex circuits using negative feedback techniques.

The adder node S, shown separately from the block $Z_{AC}$ in the drawing figure, may, in the practical embodiment of the telephone circuit, also be part of the complex circuit which constitutes the block $Z_{AC}$.

According to the present invention, to obtain, as a function of the subscriber's line and its specific overall impedance, an automatic regulation of the level of the "charging signals" and therefore to achieve one of the objects of the present invention, a signal which is an image of the overall speech and charging signals supplied to the subscriber's line, which is therefore the same overall adapted signal or a linear transformation thereof, is taken from a point N of the signal path of the subscriber's line circuit.

In this case, the point N, shown downstream of the block $Z_{AC}$, may in fact be a circuit node incorporated in the complex circuit forming the practical embodiment of the block $Z_{AC}$.

This image signal is filtered through a commercially available high-pass filter F which eliminates the components of the signal included within the telephone band of the speech signals.

A rectifier circuit $|V|$, e.g. — semiconductor diodes, then rectifies the filtered signal and a comparator COMP, e.g.—National Semiconductor LM 339 analog comparator, compares the rectified signal with a reference signal $V_{REF}$.

The comparator COMP generates, when the amplitude of the rectified signal is greater than the amplitude of the reference signal, a signal which causes, via a logic circuit LC to which the comparator is connected, the opening of the switch $S_1$ which is kept open until the subsequent closure command, produced by a signal from the exchange control components. In this way, the level of the pulse signals supplied by the second voltage generator IG and thus the level of the "charging signals" on the line is regulated, pulse by pulse, by the physical and electrical conditions of the line itself.

The individual blocks shown in the drawing figures may be embodied in circuit form in the normal way known to persons skilled in the art. Although a single embodiment of the invention has been described and illustrated, it is obvious that a number of variants are possible without departing from the scope of the invention.

We claim:

1. A telephone circuit for generating control signals for a subscriber's charging display and constituting an interface between a subscriber's telephone line and exchange control components together with a subscriber's line speech circuit, said subscriber's line speech circuit comprising a speech signal generator and a circuit means for adapting signals supplied by said speech signal generator to the subscriber's telephone line, said telephone circuit comprising: a first voltage signal generator for supplying an AC signal having a predetermined amplitude and frequency which are constant over time, and a second voltage signal generator for supplying pulse signals which are uniformly spaced over time and which have a trapezoidal pulse waveshape, said second voltage generator being coupled to said exchange control components which determine starting times of a leading edge and a trailing edge of each of said pulse signals;

a multiplier circuit which is connected to said first and second voltage generators and which has a gain which is varied in a linear manner in accordance with a voltage level of said pulse signals generated bY said second voltage generator, said multiplier calculating the product over time of said voltage signals supplied by said first and second voltage generators and supplying a voltage signal which is added to signals generated by said speech signal generator included in said subscriber's line speech circuit and a coupling means for receiving, at a point along a signal path of said subscriber's line speech circuit, an image signal of said signals adapted to said subscriber's telephone line:

a high-pass filter connected to said coupling means for filtering said image signal so as to eliminate components of said signal included in a telephone band of speech signals; a rectifier circuit connected to said high-pass filter for rectifying said filtered image signal; and a comparator connected to said rectifier circuit and to a reference signal generator for comparing a rectified signal output by said rectifier circuit with a reference signal generated by said reference signal generator and for generating, if an amplitude of said rectified signal is greater than an amplitude of said reference signal, a signal for stopping an increase of the signal level of a leading edge of signals which are generated by said second voltage generator, said signal level being kept constant up to the beginning of a trailing edge of said signals for said second voltage signal generator by means of a memory means included in the said second signal voltage generator.

2. A telephone circuit as claimed in claim 1, wherein said second voltage signal generator comprises a capacitor having a first terminal which is maintained at a constant reference potential and having a second terminal which is coupled to a supply source having a positive potential with respect to said constant reference potential via a first controll-ed switch and a first constant current, generator, the first terminal being coupled to a non-positive potential reference with respect to said constant reference potential via a second controlled switch and a second constant current generator, and wherein the non-simultaneous closure of said first and second controlled switches is carried out by exchange control means, an opening of said first switch being caused 'by said signal generated by said comparator, and a voltage between said first and second terminals of said capacitor forms said signal supplied by said second voltage signal generator, and wherein said capacitor also comprises said memory means for keeping said signal level constant when said first and second switches are open.

* * * * *